US007454256B2

(12) United States Patent

Ohashi et al.

(10) Patent No.: US 7,454,256 B2

(45) Date of Patent: Nov. 18, 2008

(54) NC DEVICE

(75) Inventors: Hajime Ohashi, Aichi pref. (JP); Kazuhiro Kikata, Aichi pref. (JP); Morikuni Kimura, Aichi pref. (JP); Tetsuya Itoh, Aichi pref. (JP); Tomohisa Yamazaki, Aichi pref. (JP)

(73) Assignee: Yamazaki Mazak Corporation (JP)

(*) Notice: Subject to any disclaimer, the term of this patent is extended or adjusted under 35 U.S.C. 154(b) by 137 days.

(21) Appl. No.: 11/261,072

(22) Filed: Oct. 27, 2005

(65) Prior Publication Data

US 2006/0106616 A1 May 18, 2006

(30) Foreign Application Priority Data

Oct. 29, 2004 (JP) ............................ 2004-317198

(51) Int. Cl.
*G05B 15/00* (2006.01)
*G05B 9/02* (2006.01)
*G05B 13/02* (2006.01)

(52) U.S. Cl. ............................ 700/83; 700/18; 700/80; 700/33

(58) Field of Classification Search ............ 700/18.159, 700/83, 80, 33; 703/1; 358/1.15; 710/1; 40/610

See application file for complete search history.

(56) References Cited

U.S. PATENT DOCUMENTS 4,550,375 A 10/1985 Sato et al.
4,908,746 A * 3/1990 Vaughn ....................... 700/18
5,604,914 A * 2/1997 Kabe ............................ 710/1
5,999,708 A * 12/1999 Kajita ....................... 358/1.15
6,003,257 A * 12/1999 Stokes ......................... 40/610
6,246,920 B1 * 6/2001 Mizuno et al. .............. 700/159
6,292,712 B1 9/2001 Bullen
6,400,998 B1 6/2002 Yamazaki et al.
6,523,193 B2 * 2/2003 Saraya .......................... 4/623
6,609,038 B1 * 8/2003 Croswell et al. .............. 700/83
6,671,571 B1 12/2003 Matsumiya et al.
2002/0193972 A1 * 12/2002 Kudo et al. .................... 703/1

(Continued)

FOREIGN PATENT DOCUMENTS

DE 2740873 3/1979

(Continued)

OTHER PUBLICATIONS

Extended European Search Report for Application No. EP 05256639.

*Primary Examiner*—Albert DeCady
*Assistant Examiner*—Sunray R Chang
(74) *Attorney, Agent, or Firm*—Sheridan Ross P.C.

(57) ABSTRACT

An NC device includes an accumulation portion for accumulating a report-item corresponding to a report-requiring situation that occurs in a machine. A voice generator control section of the device operates a voice generator to generate a voice for announcing a report-item accumulated by an accumulation portion if a determination portion determines that a operator-in-range information has been generated or in response to a request produced by a request portion. Contrastingly, the voice generator control section does not permit the voice generator to generate the voice if the determination portion determines that the operator-in-range information has not been generated. In this manner, the voice generation is performed efficiently and the operator is reliably informed of the report item.

10 Claims, 4 Drawing Sheets

U.S. PATENT DOCUMENTS

| | | | |
|---|---|---|---|
| 2003/0033048 | A1 | 2/2003 | Nakamura et al. |
| 2007/0050079 | A1 | 3/2007 | Itoh et al. |

FOREIGN PATENT DOCUMENTS

| | | |
|---|---|---|
| EP | 0061839 | 10/1982 |
| EP | 0597127 | 5/1994 |
| JP | 05-019829 | 1/1993 |
| JP | 07-223148 | 8/1995 |
| JP | 11-33867 | 2/1999 |

* cited by examiner

| ID No | Report Items |
|---|---|
| 1 | Barrier invalid |
| 2 | Attachment missing |
| 3 | Operation suspended due to mechanical interference in subsequent block |
| 4 | Attachment coming to life end |
| 5 | Machining coming to end |
| 6 | Operation suspended due to alarm |
| | |
| | |
| | |

140a (ID No 1–2); 140b (Report Items 1–2)

| n | Message Table | | |
|---|---|---|---|
| | Report ID No. | Occurrence Time | Output Confirmation Flag |
| 1 | 5 | 10:20 | |
| 2 | 4 | 14:35 | |
| 3 | 6 | 17:50 | |
| 4 | | | |
| | | | |
| | | | |
| 19 | | | |
| 20 | | | |

150d (n 1–2); 150a (Report ID No.); 150b (Occurrence Time); 150c (Output Confirmation Flag)

NC DEVICE

BACKGROUND OF THE INVENTION

The present invention relates to numerical control devices (NC devices) provided in numerical control machine (NC machine tools), and more particularly, to NC devices capable of generating audio instructions.

Conventionally, NC devices that inform the operator of problems occurring in NC machine tools through voice generation or by means of displays have been known. Also, an NC device described in Japanese Laid-Open Patent Publication No. 5-19829 computes, for example, an estimated time for performing a periodic inspection and announces this time to the operator using a generated voice, thus improving work efficiency.

More specifically, for example, an estimated operation time consumed by executing a machining instruction program is preset in the NC device. The NC device computes an estimated operation end time in accordance with the preset value and announces the obtained time by means of a voice generator.

However, the NC machine tool of the aforementioned document generates the voice for announcing the estimated operation end time or a problem occurring in the machine tool, regardless of whether or not the operator is located in an audible range of the voice. That is, the voice is generated unnecessarily if the announcement is inaudible to the operator. In this case, the information is not reliably provided to the operator.

SUMMARY OF THE INVENTION

Accordingly, it is an objective of the present invention to provide an NC device capable of preventing unnecessary voice generation and reliably providing necessary information to an operator located in an audible range of the voice.

To achieve the foregoing and other objectives and in accordance with the purpose of the present invention, the invention provides an NC device for numerically controlling a machine in accordance with an NC machining program. The device includes an accumulation portion for accumulating a report-item corresponding to a report-requiring situation that occurs in the machine; a voice generator for generating a voice; and a voice generator control section for controlling the voice generator. A determination portion determines whether or not operator-in-range information has been generated for indicating that an operator is located in an audible range of the voice generated by the voice generator when the report-requiring situation occurs in the machine. A request portion requests generation of the voice when the request portion is manipulated by the operator or in response to detection of the operator in the audible range. The voice generator control section operates the voice generator to generate the voice for announcing the report-item accumulated by the accumulation portion if the determination portion determines that the operator-in-range information has been generated or in response to a request produced by the request portion but does not permit the voice generator to generate the voice if the determination portion determines that the operator-in-range information has not been generated.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 4 is a view explaining the content of a report item memory 140; and FIG. 5 is a view explaining the content of a report memory 150 including a message table.

DETAILED DESCRIPTION OF THE PREFERRED EMBODIMENTS

An embodiment of the present invention will now be described with reference to the attached drawings.

Figure 1:
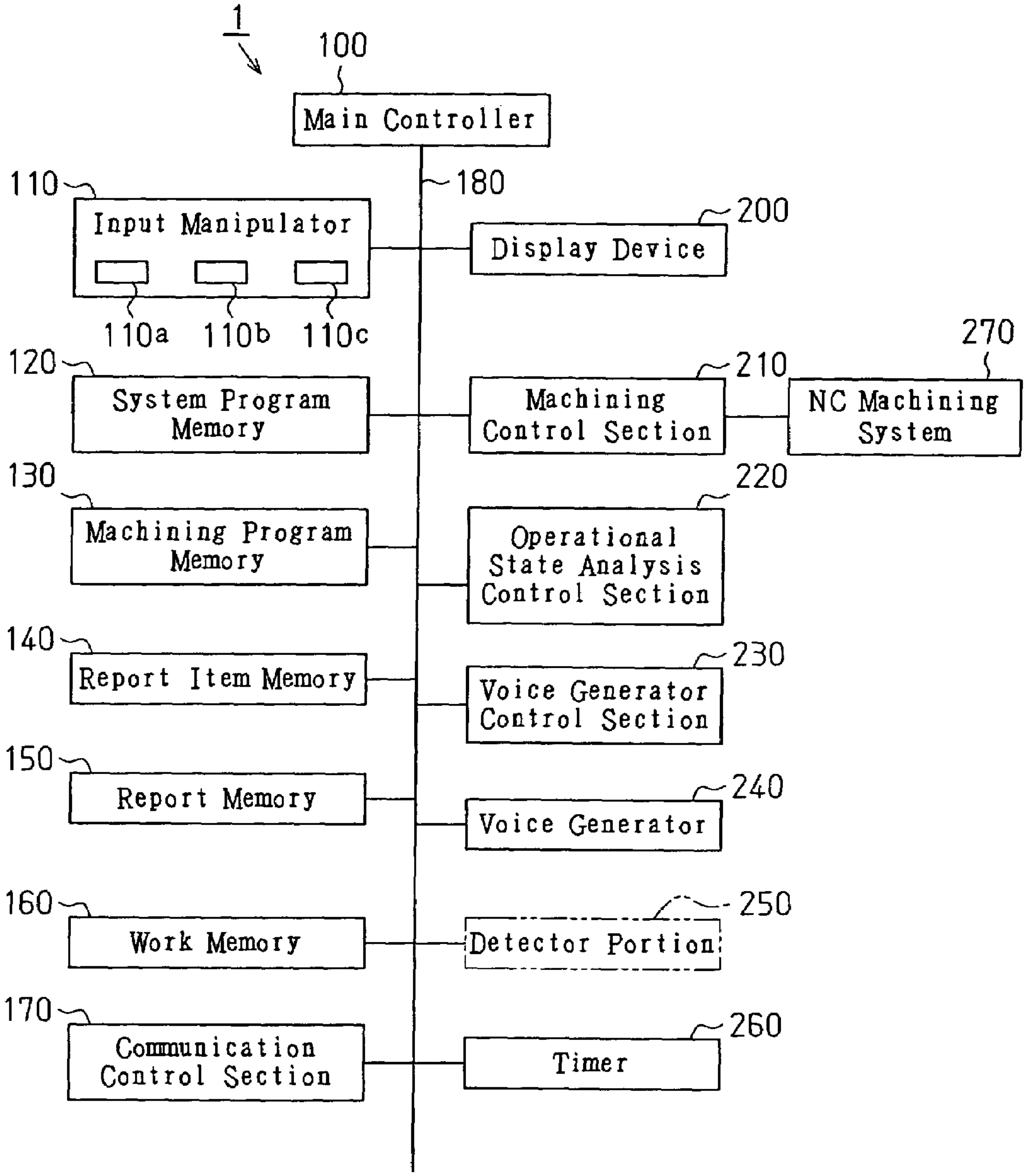
FIG. 1 is a block diagram showing functions of an NC device 1 according to an embodiment of the present invention.

As shown in FIG. 1, an NC device 1 of the embodiment is provided in an NC machining system 270. The NC machining system 270 functions as a machine, or an NC machine tool, such as a lathe or a machining center.

The NC device 1 includes a main controller 100, an input manipulator 110, a system program memory 120, a machining program memory 130, a report item memory 140, a report memory 150, a work memory 160, and a communication control section 170. The NC device 1 also includes a display device 200, a machining execution control section 210, an operational state analysis control section 220, a voice generator control section 230, a voice generator 240, and a timer 260. The memories 120 to 160 and the sections 170 to 230 are connected to the main controller 100 through a bus line 180.

The input manipulator 110 is formed by, for example, a keyboard. The input manipulator 110 includes an out-of-range key 110*a*, a cycle start key 110*b*, and a voice generation request key 110*c*. The system program memory 120 stores a system program for controlling the system of the NC device 1 and an operational state analysis program.

The machining program memory 130 stores an NC machining program including a plurality of continuous steps. Each of the steps includes at least one execution block. The steps are defined in correspondence with different machining attachments used for machining target portions of a workpiece. Through the NC machining program, the NC machining system 270 performs numerical controlling.

As shown in FIG. 4, the report item memory 140 stores different report items in correspondence with assumed report-requiring situations that may occur when the NC machining system 270 is automatically operated. The report item memory 140, which is formed by, for example, a ROM, has a first report area 140*a* for storing identification numbers (ID numbers) for identifying the report items and a second report area 140*b* for storing the report items. More specifically, the report items stored in the second report area 140*b* include, for example, "Barrier Invalid", "Attachment Missing", and "Operation Suspended due to Mechanical Interference in Subsequent Block". The report-requiring situations associated with these report items will be explained in detail later, in the description of step S20.

As shown in FIG. 5, the report memory 150, which is formed by, for example, a RAM, includes the message table having a first message area 150*a*, a second message area 150*b*, a third message area 150*c*, and a fourth message area 150*d*. The first message area 150*a* stores the identification numbers of the report items. The second message area 150*b* stores occurrence times of, if any, the report-requiring situations. The third message area 150*c* is provided for setting output confirmation flags for confirming generation of a voice, or message record flags. More specifically, if at least one of the output confirmation flags is held in an OFF state, it is indicated that the message record flag is in an ON state. The fourth message area 150*d* corresponds to an address area for identifying an area in which archive data is stored, including the ID numbers stored in the first message area 150*a* and the occurrence times of the report-requiring situations stored in the second message area 150*b*. The main controller 100 writes data in and reads data from the work memory 160 in execution of various procedures. The communication control section 170 receives and transmits data with respect to different non-illustrated devices.

The machining execution control section 210 controls the NC machining system 270 in accordance with the machining program. The operational state analysis control section 220 analyzes the operational state of the NC machining system 270. The voice generator control section 230 controls the voice generator 240 in accordance with a control instruction from the main controller 100. The voice generator 240 includes a voice generating portion and a speaker. The timer 260 measures time. The NC device 1 is attached integrally to a casing of the NC machining system 270.

Next, the operation of the NC device 1 will be described with reference to the flowcharts of FIGS. 2 and 3. The flowcharts represent procedures executed by the operational state analysis control section 220 in accordance with a control instruction from the main controller 100. More specifically, the flowchart of FIG. 2 corresponds to a cycle in which the NC device 1 analyzes the operational state of the NC machining system 270 and thus determines whether or not a report-requiring situation has occurred and whether or not the operator is located in an audible range assumed around the NC machining system 270.

(Step S10)

Figure 2:
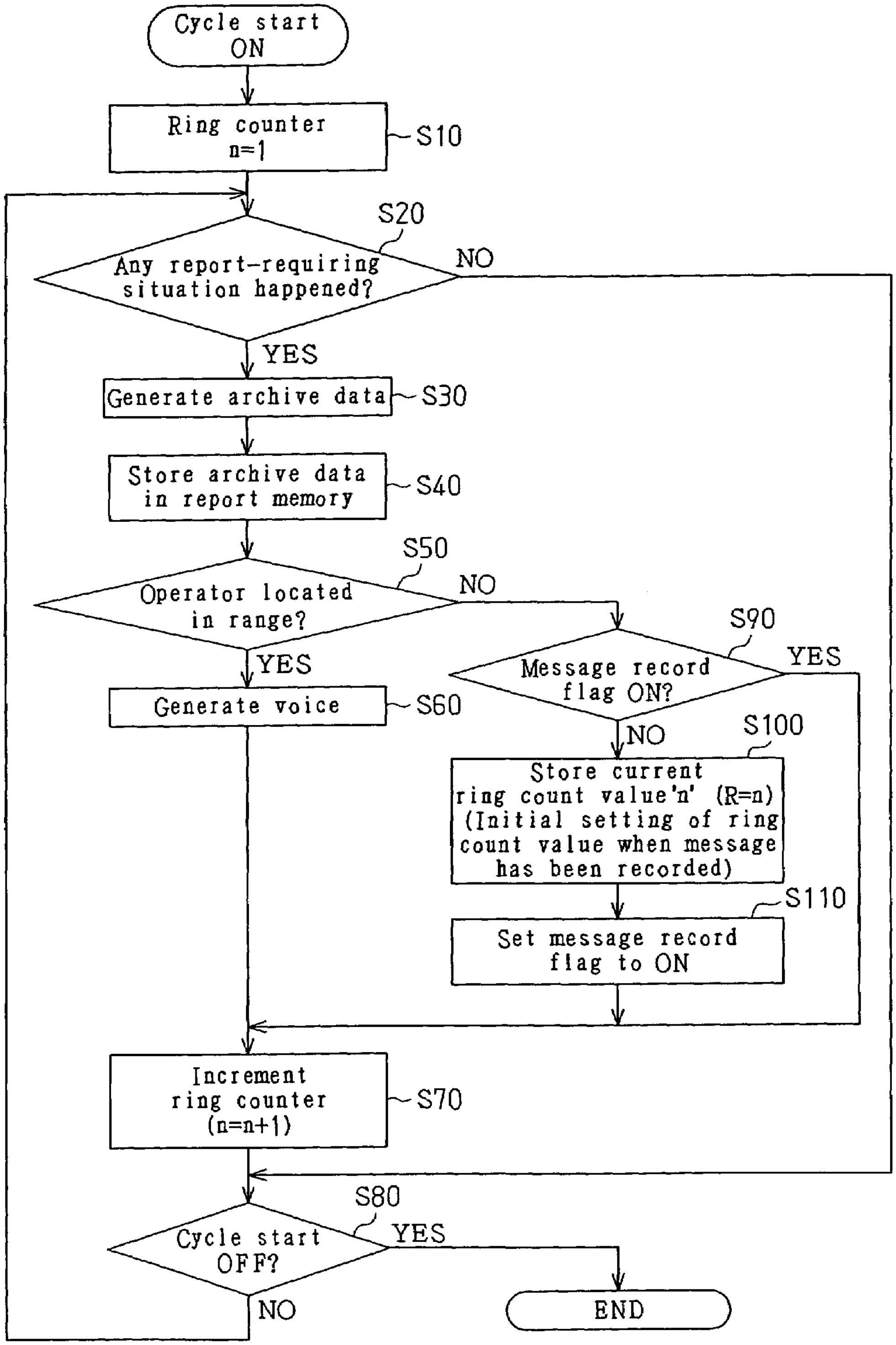
FIG. 2 is a flowchart representing an operational state analysis cycle of an NC machining system 270 performed by an operational state analysis control section 220 of FIG. 1.
Figure 3:
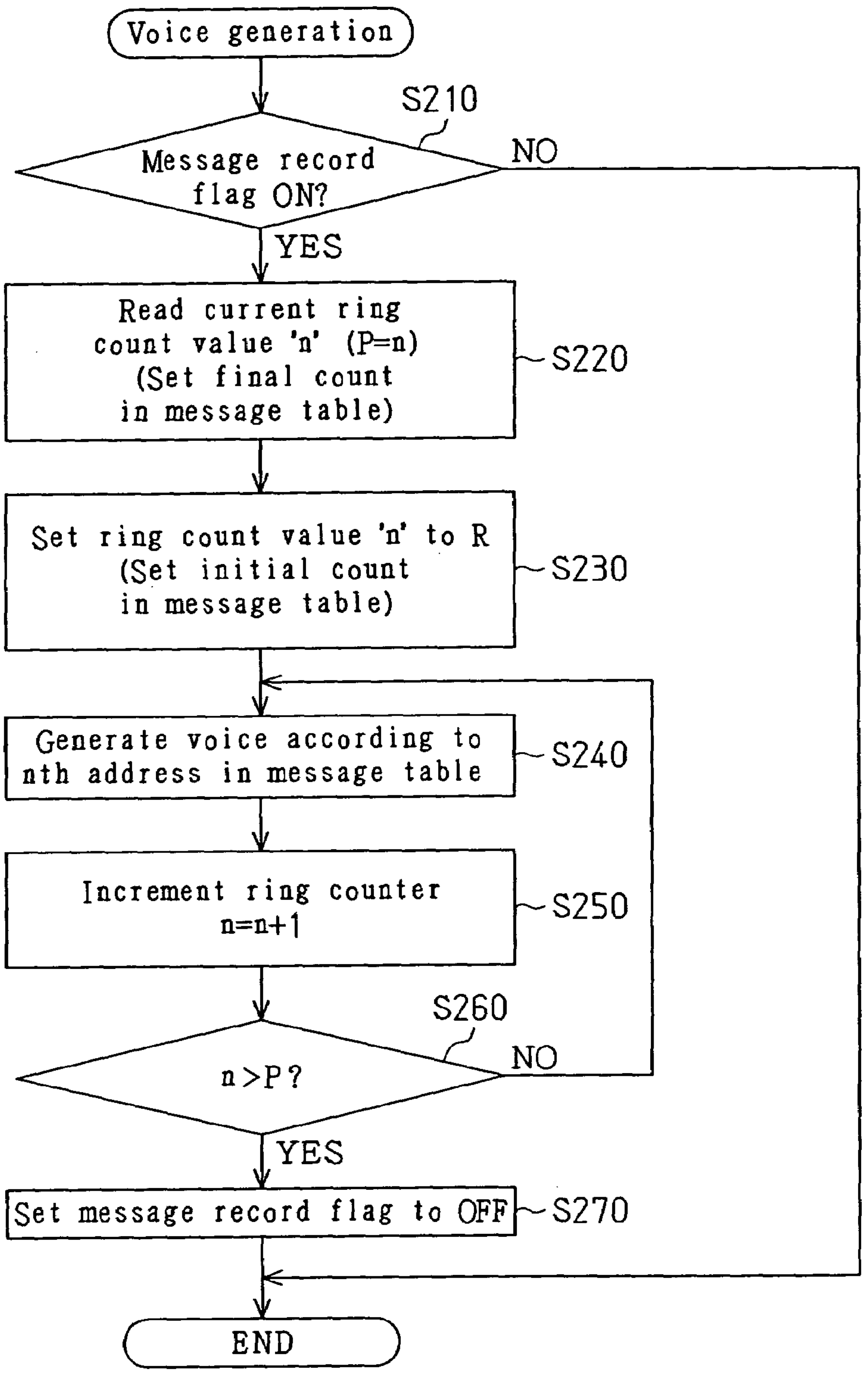
FIG. 3 is a flowchart representing a procedure performed by the operational state analysis control section 220 of FIG. 1 when a message has been recorded.

FIG. 2 represents steps S10 to S120. When determining that the cycle start key 110*b* of the input manipulator 110 has been manipulated by the operator, the operational state analysis control section 220 sets a ring count value “n” to 1 (n=1) in step S10. The ring count value “n” corresponds to an address value of the fourth message area 150*d* of the report memory 150. As shown in FIG. 5, in the illustrated embodiment, the ring count value “n” may be set in a range, for example, from 1 to 20 (n=1 to 20). However, the value “n” is not limited to this range. Further, the operator may be a human or, if possible, an AI-programmed robot.

(Step S20)

In step S20, the operational state analysis control section 220 determines whether or not a report-requiring situation has been caused in the NC machining system 270. Such analysis is performed by the operational state analysis control section 220 by a known method described in, for example, Japanese Laid-Open Patent Publication No. 5-19829. When the NC machining system 270 is in operation, the operational state analysis control section 220 reads an operational state analysis program from the system program memory 120, in accordance with a control instruction from the main controller 100. The operational state of the NC machining system 270 is controlled according to the obtained analysis program. In this state, if the operational state analysis control section 220 determines that a prescribed situation has occurred by the NC machining system 270 and the situation must be reported to the operator, the operational state analysis control section 220 determines that a report-requiring situation has been caused.

The report-requiring situations of the NC machining system 270 include machining problems occurring in the NC machining system 270. The problems include delays of actual operation with respect to estimated operation end times, emergencies that require that alarms be generated and the NC machining system 270 be stopped, and occurrences of mechanical interferences. The term “mechanical interferences” indicates that a stand-by period is caused in operation of multiple machine tools by one or more operators. That is, for example, the stand-by period may be caused if a second machine completes a certain operation with a first machine held in a running state and thus must be held in a stand-by state before being re-started for a subsequent operation. Further, the stand-by period may be caused following completion of a certain operation of the first machine if the second machine is still running and a different operation cannot be started until the second machine finishes the current operation.

Also, the report-requiring situations of the NC machining system 270 include a situation in which, for example, an operation end time is announced to the operator for requiring the operator to generate an instruction for a subsequent operation.

The report-requiring situations include different situations other than those above-described. For example, the operational state analysis control section 220 determines that the report-requiring situation corresponding to the report item “Attachment Missing” has occurred when an additional attachment is necessary other than those currently provided in the NC machining system 270 through analysis of an execution block of an NC machining program. Referring to FIG. 4, the operational state analysis control section 220 obtains the ID No. 4 in correspondence with the report-requiring situation in accordance with the operational state analysis program.

Also, the operational state analysis control section 220 determines whether or not a non-illustrated barrier for chucks or tail stocks, which is an off-limit area for tools in operation, has been invalidated. When the determination is positive, the operational state analysis control section 220 determines that a report-requiring situation has occurred and obtains the ID No. 1 in correspondence with the report item “Barrier Invalid”, in accordance with the operational state analysis program.

(Step S30)

In step S30, the operational state analysis control section 220 generates archive data. The archive data includes the ID numbers of the report items corresponding to the report-requiring situations and the occurrence times of these situations. The ID numbers and the occurrence times of the report-requiring situations are mutually associated. The report item memory 140 includes a predefined database for associating the report-requiring situations with the corresponding report items. Thus, if one of the report-requiring situations has occurred, the operational state analysis control section 220 is allowed to select the report item associated with the report-requiring situation in accordance with the database. The timer measures the occurrence time of the report-requiring situation.

(Step S40)

In step S40, the operational state analysis control section 220 stores the archive data (including the ID number of the report item and the occurrence time of the report-requiring situation) generated in step S30 in the first and second message areas 150*a*, 150*b*, respectively, in correspondence with an address corresponding to a current ring count value "n" (see FIG. 5).

(Step S50)

In step S50, the operational state analysis control section 220 determines whether or not the operator is located in the audible range around the NC machining system 270. When the operator is to move out of the audible range, the out-of-range key 110*a* of the input manipulator 110 is manipulated by the operator. This generates a manipulation signal, which serves as operator-in-range information. Depending on whether the manipulation signal has been generated or not, the operational state analysis control section 220 determines whether or not the operator is located in the audible range around the NC machining system 270. More specifically, if the NC machining system 270 is started after having been held in a stand-by state, it is assumed that the operator is located in the audible range around the NC machining system 270. The input manipulator 110 thus generates the operator-in-range information. The input manipulator 110 stops generation of the operator-in-range information if the out-of-range key 110*a* is manipulated by the operator, who is to move out of the audible range. Later, if the out-of-range key 110*a* is re-manipulated by the operator, who has re-entered the audible range, the input manipulator 110 regenerates the operator-in-range information.

Alternatively, the operational state analysis control section 220 may determine that the operator is located out of the audible range if the out-of-range key 110*a* of the input manipulator 110 has not been manipulated for a predetermined time (for example, thirty minutes), instead of using the manipulation signal generated through manipulation of the out-of-range key 110*a*.

Alternatively, different operation schedules of the operator or machining schedules may be pre-inputted through the input manipulator 110 and thus stored in the system program memory 120. This allows the operational state analysis control section 220 to determine whether or not the operator is located in the audible range in correspondence with the operation schedules or the machining schedules. These schedules include time information regarding when the operator is located in the audible range, or the operator-in-range information, and time information regarding when the operator is not located in the audible range. The operational state analysis control section 220 is thus allowed to determine whether or not the operator-in-range information has been generated, in correspondence with the schedule data. Further, such determination may be made using the aforementioned methods in combination.

When determining that the operator is located in the audible range around the NC machining system 270 in step S50, or "YES" in FIG. 2, the operational state analysis control section 220 executes step S60. Contrastingly, when the determination of step S50 is negative, or "NO" in FIG. 2, step S90 is carried out.

(Step S60)

In step S60, in accordance with a current ring count value "n", the operational state analysis control section 220 reads the contents of the first and second message areas 150*a*, 150*b* corresponding to an nth address, out from the report memory 150. The main controller 100 selects the ID number corresponding to the ID number obtained from the first message area 150*a* from the first report area 140*a* of the report item memory 140. The main controller 100 then reads the report item corresponding to the ID number from the second report area 140*b*. Subsequently, the main controller 100 operates the voice generator control section 230 to generate a voice by the voice generator 240 for announcing the report item obtained from the second report area 140*b* and the occurrence time obtained from the second message area 150*b*. When the contents of the first and second message areas 150*a*, 150*b* corresponding to the nth address are obtained from the report memory 150, the operational state analysis control section 220 turns on the output confirmation flag in the third message area corresponding to the nth address.

(Step S70)

In step S70, the operational state analysis control section 220 increments the ring count value "n" by one.

(Step S80)

In step S80, the operational state analysis control section 220 determines whether or not a cycle start flag has been turned off. More specifically, when the NC machining system 270 is in automatic-operation, the NC machining program maintains the cycle start flag in an ON state. If this is the case, the operational state analysis control section 220 performs step S20. In contrast, if the NC machining system 270 is not in automatic operation or such operation is complete, the NC machining program turns off the cycle start flag. In this case, the procedure of FIG. 2 is suspended.

(Step S90)

When determining that the operator is not located in the audible range around the NC machining system 270 in step S50, the operational state analysis control section 220 performs step S90, or determines whether or not at least one of the output confirmation flags in the third message area 150*c* has been turned on. If the determination is negative, the operational state analysis control section 220 performs step S100. If the determination is positive, the operational state analysis control section 220 performs step S70.

(Step S100)

In step S100, the operational state analysis control section 220 stores a current ring count value "n" in the work memory 160 as an initial count value R (R=n). This operation corresponds to initial setting of the ring counter performed when a message is recorded.

(Step S110)

In step S110, the operational state analysis control section 220 turns on the message record flag and then performs step S70.

As has been described, in the illustrated embodiment, each time the NC device 1 determines that a certain one of the report-requiring situations has occurred in step S20, the NC device 1 generates a voice in step S60 for announcing the report item corresponding to the report-requiring situation, for example, "Barrier Invalid" and the occurrence time of the report-requiring situation as long as the operator is located in the audible range around the NC machining system 270 (for example, the out-of-range key 110*a* is maintained in a non-manipulated state).

If the operator is not located in the audible range around the NC machining system 270 (for example, the out-of-range key 110*a* has been manipulated) and multiple report-requiring situations have occurred in the NC machining system 270, the NC device 1 operates in accordance with a loop defined by step S20, steps S30 to S50, steps S90 to S110, step S70, and step 80 in this order and returning to step S20. In this manner, the report memory 150 is allowed to store archive data in correspondence with each of the report-requiring situations that have occurred. In this case, since it is determined in step S50 that the operator is not located in the audible range around the NC machining system 270, voice generation by the NC device 1 does not occur.

If the operator returns to the audible range around the NC machining system 270, the NC device 1 operates in the following manner. When the operator re-enters the audible range, the operator manipulates the voice generation request key 110*c* of the input manipulator 110. In response to the manipulation, the operational state analysis control section 220 executes the procedure of the flowchart of FIG. 3 in accordance with a control instruction from the main controller 100. The flowchart of FIG. 3 represents the procedure performed if a message has been recorded.

(Step S210)

In step S210, the operational state analysis control section 220 determines whether or not the message record flag in the third message area 150*c* has been turned on. If the determination is negative, the routine of FIG. 3 is suspended.

If the determination is positive, the operational state analysis control section 220 performs step S220.

(Step S220)

In step S220, the operational state analysis control section 220 reads a current ring count value "n" and sets the value "n" as a final count value P in the fourth message area 150*d* of the message table (P=n).

(Step S230)

In step S230, the operational state analysis control section 220 sets the initial count value R to the ring count value "n" (n=R). The initial count value R corresponds to an address representing the content that should be read from the message table of the report memory 150 first when the NC device 1 is to generate a voice.

(Step S240)

In step S240, the operational state analysis control section 220 outputs the content of the message table corresponding to the nth address in correspondence with the ring count value "n", out from the report memory 150. The main controller 100 reads the report item corresponding to the ID number obtained from the first message area 150*a*, out from the second report area 140*b* of the report item memory 140. The main controller 100 then operates the voice generator control section 230 to generate a voice by the voice generator 240 for announcing the report item obtained from the second report area 140*b* and the occurrence time of the report-requiring situation obtained from the second message area 150*b*. When the contents of the first and second message areas 150*a*, 150*b* corresponding to the nth address are outputted from the report memory 150, the operational state analysis control section 220 turns on the output confirmation flag in the third message area 150*c* corresponding to the nth address.

When the voice generation request key 110*c* is manipulated by the operator, the main controller 100 sends the archive data from the report memory 150 to the display device 200. The display device 200 displays the archive data in such a manner as to allow the operator to acknowledge whether or not the output confirmation flags of the third message area 150*c* associated with the data have been already turned on. More specifically, the display device 200 changes the color or the mark for displaying the archive data depending on whether or not the associated output confirmation flag has been turned on. This allows the operator to distinguish the archive data that has been already outputted through voice generation from the archive data that has not.

(Step S250)

In step S250, the operational state analysis control section 220 increments the ring count value "n" by one. The operational state analysis control section 220 then performs step S260.

(Step S260)

In step S260, the operational state analysis control section 220 determines whether or not the ring count value "n" that has been incremented in step S250 exceeds the final count value P of the fourth message area 150*d* of the message table. If the determination is negative ($n \leqq P$), the operational state analysis control section 220 repeats step S240. If the determination is positive ($n>P$), the operational state analysis control section 220 performs step S270.

(Step S270)

In step S270, the operational state analysis control section 220 turns off the message record flag and suspends the routine.

As has been described, by manipulating the voice generation request key 110*c*, the operator can be informed of the report item corresponding to the report-requiring situation that has occurred in the NC machining system 270 while the operator was out of the audible range by means of the voice generated by the NC device 1. Further, if the multiple report-requiring situations have occurred in the NC machining system 270 while the operator was out of the audible range, the report items corresponding to the report-requiring situations are announced to the operator together with and in accordance with the occurrence times by the generated voice. This allows the operator to respond to the problems corresponding to the report items appropriately.

In the illustrated embodiment, the operation of the operational state analysis control section 220 in step S30 corresponds to the operation of a selection portion that selects the report items corresponding to the report-requiring situations from the database. The operation of the operational state analysis control section 220 in step S50 corresponds to the operation of a determination portion that determines whether or not the operator-in-range information, which indicates that the operator is located in the audible range around the NC machining system 270, has been generated. The report item memory 140 corresponds to a memory portion that stores the database in which the report-requiring situations and the report items are arranged systematically and in a searchable manner. The report memory 150 corresponds to an accumulation portion that accumulates the report items corresponding to the report-requiring situations that have occurred in the NC machining system 270.

The input manipulator 110 having the out-of-range key 110*a* corresponds to an input portion that inputs the operator-in-range information to the operational state analysis control section 220 depending on manipulation of the out-of-range key 110*a* by the operator. The input manipulator 110 having the voice generation request key 110*c* corresponds to a request portion that requires the voice generation in correspondence with manipulation of the voice generation request key 110*c* or detection of the operator in the audible range. The manipulation signal generated by manipulating the out-of-range key 110*a* corresponds to the operator-in-range information.

The timer 260 corresponds to a timer portion.

The illustrated embodiment has the following advantages.

(1) The voice generator control section 230 controls the voice generator 240 to generate a voice for announcing the report item stored in the report memory 150 when the operational state analysis control section 220 determines that the operator-in-range information has been generated or a request has been generated through the input manipulator 110. When the operational state analysis control section 220 determines that the operator-in-range information has not been generated, controlling of the voice generator 240 by the voice generator control section 230 does not occur. Thus, the NC device 1 reliably informs the operator of the report item that must be reported to the operator, only when the operator is located in the audible range around the NC machining system 270. Further, voice generation by the NC device 1 does not occur when the operator is located out of the audible range. That is, by inputting a voice generation request through the input manipulator 110, the operator is allowed to acknowledge the report item corresponding to the report-requiring situation that has occurred in the NC machining system 270 while the operator was out of the audible range by the voice generated in response to the request. The operator is thus reliably informed of the report item that must be reported to the operator. Since the report item may include an operational instruction to the operator, erroneous operation of the operator is prevented.

(2) The operational state analysis control section 220 selects the report item corresponding to the report-requiring situation that has occurred in the NC machining system 270 from the pre-accumulated database. The report memory 150 stores the selected report item. That is, when the report-requiring situation occurs in the NC machining system 270, the report memory 150 stores the report item corresponding to the report-requiring situation. Accordingly, in response to the voice generation request produced through the input manipulator 110, the report item stored in the memory 150 is easily outputted through the voice generation and thus announced to the operator reliably.

(3) The input manipulator 110 inputs the operator-in-range information to the operational state analysis control section 220 in response to manipulation of the out-of-range key 110*a*. This allows the operational state analysis control section 220 to easily determine whether or not the operator-in-range information has been generated when the report-requiring situation occurs in the NC machining system 270. When it is determined that the operator is located in the audible range around the NC machining system 270, the operator is reliably informed of the report item that must be reported to the operator. In contrast, if the operator-in-range information has not been inputted to the operational state analysis control section 220 by the input manipulator 110, the operational state analysis control section 220 determines that the operator is not located in the audible range around the NC machining system 270. The voice generation thus does not occur.

(4) If the multiple report-requiring situations occur in the NC machining system 270, the report memory 150 stores the report items corresponding to the report-requiring situations sequentially. If the operator is not located in the audible range around the NC machining system 270, the voice generation does not occur. If the operator is located in the audible range around the NC machining system 270, the report items stored in the report memory 150 are outputted through the voice generation sequentially. This allows the operator to acknowledge the report-requiring situations that have occurred in the NC machining system 270 while he was out of the audible range, sequentially according to the order of occurrence of these situations.

(5) The operator is allowed to acknowledge the time of occurrence of each of the report-requiring situation, which is measured by the timer 260, by the generated voice.

It should be apparent to those skilled in the art that the present invention may be embodied in many other specific forms without departing from the spirit or scope of the invention. Particularly, it should be understood that the invention may be embodied in the following forms.

In the illustrated embodiment, it is determined whether or not that the operator is located in the audible range around the NC machining system 270 depending on whether or not the keys of the input manipulator 110 have been manipulated. However, a detector portion 250 such as an infrared sensor or a supersonic sensor may be provided in the vicinity of the NC machining system 270 for detecting the operator. The detector portion 250 is shown by the broken lines in FIG. 1. The detector portion 250 generates a detection signal when the operator is detected. The NC device 1 determines that the determination of step S50 is "YES" if the detection signal is generated. Contrastingly, the determination of step S50 is determined to be "NO" if the detector portion 250 does not detect the operator. The detection signal corresponds to the operator-in-range information.

In this case, the detector portion 250 outputs the operator-in-range information. This allows the operational state analysis control section 220 to easily determine whether or not the operator is located in the audible range when the report-requiring situation is brought about by the NC machining system 270. Therefore, when the operational state analysis control section 220 determines that the operator is located in the audible range around the NC machining system 270, the NC device 1 reliably informs the operator of the report item that must be reported to the operator. Contrastingly, if generation of the detection signal by the detector portion 250 does not occur, the operational state analysis control section 220 determines that the operator is not located in the audible range around the NC machining system 270. The voice generation thus does not occur.

The present examples and embodiments are to be considered as illustrative and not restrictive and the invention is not to be limited to the details given herein, but may be modified within the scope and equivalence of the appended claims.

The invention claimed is:

1. An NC device for numerically controlling a machine in accordance with an NC machining program, the device comprising:

an accumulation portion for accumulating a report-item corresponding to a report-requiring situation that occurs in the machine, wherein the report-requiring situation is at least one of a situation in which a machining problem occurs in the machine and a situation for requiring an operator to generate an instruction for a subsequent operation for the machine;

a voice generator for generating a voice;

a voice generator control section for controlling the voice generator;

a determination portion for determining whether or not operator-in-range information has been generated for indicating that the operator is located in an audible range of the voice generated by the voice generator when the report requiring situation occurs in the machine; and a request portion for requesting generation of the voice when the request portion is manipulated by the operator or in response to detection of the operator in the audible range;

wherein the voice generator control section operates the voice generator to generate the voice for announcing the report-item accumulated by the accumulation portion if the determination portion determines that the operator-in-range information has been generated or in response to a request produced by the request portion but does not permit the voice generator to generate the voice if the determination portion determines that the operator-in-range information has not been generated;

wherein the voice generator control section does not permit the voice generator to generate the voice if the accumulation portion does not accumulate the report-item.

2. The device according to claim 1, further comprising a selection portion for selecting the report item corresponding to the report-requiring situation that occurs in the machine from a database including different types of report items, wherein the accumulation portion accumulates the report item selected by the selected portion.

3. The device according to claim 1, further comprising an input portion for inputting the operator-in-range information to the determination portion.

4. The device according to claim 1, further comprising a detector portion for detecting the operator in the audible range, wherein the detector portion generates the operator-in-range information when detecting the operator.

5. The device according to claim 1, wherein:

the accumulation portion is capable of archiving the report items corresponding to multiple report-requiring situations sequentially and each time the corresponding one of the report-requiring situations occurs; and the voice generator control section operates the voice generator to generate the voice for sequentially announcing the report items archived in the accumulation portion in response to the request generated by the request portion.

6. The device according to claim 1, further comprising a timer portion for measuring occurrence time of the report-requiring situation, wherein:

the accumulation portion archives the occurrence time in association with the report item corresponding to the report requiring situation; and the voice generator control section operates the voice generator to generate the voice for announcing the report item and the occurrence time archived in the accumulation portion if the determination portion determines that the operator is located in the audible range.

7. The device according to claim 1, wherein the machining problem is at least one of a delay of actual operation with respect to estimated operation end times, emergencies that require that alarms be generated and the machine be stopped, and occurrences of mechanical interferences, wherein the situation for requiring the operator to generate the instruction for the subsequent operation is at least one of a situation in which an operation end time is announced to the operator, a situation when an additional attachment is necessary other than those currently provided in the machine through analysis of an execution block of the NC machining program, and a situation wherein whether or not a non-illustrated barrier for chucks or tail stocks, which is an off-limit area for tools in operation, has been invalidated.

8. The device according to claim 1, further comprising an input portion manipulated by the operator, in at least one of a situation that the input portion includes an out-of-range key and the out-of-range key is manipulated by the operator, a situation that the input portion has not been manipulated for a predetermined time, and a situation that the determination portion stores operation schedules of the operator or machining schedules stored and the operation schedules or machining schedules tells a time information regarding when the operator is not located in the audible range, the determination portion determines that the operator-in-range information has not been generated.

9. An NC device for numerically controlling a machine in accordance with an NC machining program, comprising:

an accumulation portion for accumulating a report item corresponding to a report-requiring situation that occurs in the machine, wherein the report-requiring situation is at least one of a situation in which a machining problem occurs in the machine and a situation for requiring an operator to generate an instruction for a subsequent operation for the machine;

a voice generator for generating a voice;

a voice generator control section for controlling the voice generator; and a determination portion for determining whether or not operator-in-range information has been generated for indicating that an operator is located in an audible range of the voice generated by the voice generator when the report requiring situation occurs in the machine;

wherein the voice generator control section operates the voice generator to generate the voice for announcing the report item accumulated by the accumulation portion if the determination portion determines that the operator-in-range information has been generated but does not permit the voice generator to generate the voice if the determination portion determines that the operator-in-range information has not been generated;

wherein the voice generator control section does not permit the voice generator to generate the voice if the accumulation portion does not accumulate the report-item.

10. An NC device numerically for controlling a machine in accordance with an NC machining program, comprising:

an accumulation portion for accumulating a report item corresponding to a report-requiring situation that occurs in the machine, wherein the report-requirinq situation is at least one of a situation in which a machining problem occurs in the machine and a situation for requiring an operator to generate an instruction for a subsequent operation for the machine;

a voice generator for generating a voice:

a voice generator control section for controlling the voice generator; and a request portion for requesting generation of the voice when the request portion is manipulated by the operator or in response to detection of the operator in an audible range of the voice;

wherein the voice generator control section operates the voice generator to generate the voice for announcing the report item accumulated by the accumulation portion in response to a request generated by the request portion but does not permit the voice generator to generate the voice if the request by the request portion has not been generated;

wherein the voice generator control section does not permit the voice generator to generate the voice if the accumulation portion does not accumulate the report item.

* * * * *